US007133741B2

(12) United States Patent

Mätzig et al.

(10) Patent No.: US 7,133,741 B2
(45) Date of Patent: Nov. 7, 2006

(54) METHOD AND DEVICE FOR ACCEPTING ARTICLES IN THE FORM OF SHEET-TYPE MATERIAL

(75) Inventors: Christoph Mätzig, Ampfing (DE); Dirk Schelling, Starnberg (DE); Karl-Heinz Strasser, Olching (DE); Ralf Hobmeier, München (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/381,597

(22) PCT Filed: Oct. 1, 2001

(86) PCT No.: PCT/EP01/11335

§ 371 (c)(1),
(2), (4) Date: Jul. 31, 2003

(87) PCT Pub. No.: WO02/31781

PCT Pub. Date: Apr. 18, 2002

(65) Prior Publication Data

US 2004/0012144 A1 Jan. 22, 2004

(30) Foreign Application Priority Data

Oct. 6, 2000 (DE) ................................ 100 49 432

(51) Int. Cl.
*G06F 7/06* (2006.01)

(52) U.S. Cl. ................ 700/221; 270/52.02; 270/52.03; 270/1.03

(58) Field of Classification Search ............. 270/52.02, 270/52.03, 1.02, 1.03; 700/221, 224
See application file for complete search history.

(56) References Cited

U.S. PATENT DOCUMENTS 4,800,505 A * 1/1989 Axelrod et al. ............. 700/221
4,877,235 A 10/1989 Robinson et al.
5,104,105 A * 4/1992 Cote et al. ................. 270/1.02
5,191,540 A * 3/1993 Ramsey ...................... 700/221
5,247,159 A 9/1993 Yuge et al.

(Continued)

FOREIGN PATENT DOCUMENTS

DE 31 37 667 C2 4/1982

(Continued)

*Primary Examiner*—Patrick Mackey
(74) *Attorney, Agent, or Firm*—Bacon & Thomas, PLLC

(57) ABSTRACT

The present invention relates to a method and apparatus for accepting sheet material, in particular papers of value such as bank notes, checks, etc., whereby different groups of sheet material are successively accepted and stored.

In a known method and corresponding apparatus for accepting groups of sheet material such as bank notes, the bank notes coming from a deliverer are checked and stored in a storage container in the order of their input. Thus it is not always recognizable without doubt subsequently, e.g. in cases of malfunction, which deliverer certain bank notes come from.

The present invention starts out from the consideration that each group of sheet material is assigned at least one separation means and the separation means are stored at least partly together with the associated group of sheet material for separating the associated group of sheet material from other groups of sheet material.

14 Claims, 4 Drawing Sheets

U.S. PATENT DOCUMENTS

| | | | | |
|---|---|---|---|---|
| 5,419,440 | A * | 5/1995 | Picoult | 209/583 |
| 5,519,624 | A * | 5/1996 | Hidding | 700/213 |
| 5,547,175 | A * | 8/1996 | Graushar et al. | 270/37 |
| 5,575,463 | A * | 11/1996 | Parkander | 270/52.02 |
| 5,917,930 | A * | 6/1999 | Kayani et al. | 382/135 |
| 6,186,492 | B1 * | 2/2001 | Dechau et al. | 271/30.1 |
| 6,192,295 | B1 * | 2/2001 | Gunther | 700/225 |
| 6,502,812 | B1 * | 1/2003 | Belec | 270/52.02 |
| 6,732,011 | B1 * | 5/2004 | Hart et al. | 700/223 |
| 2004/0099580 | A1 * | 5/2004 | Brotherston et al. | 209/583 |

FOREIGN PATENT DOCUMENTS

| | | |
|---|---|---|
| EP | 0 710 944 A2 | 5/1996 |
| JP | 82493/1987 | 4/1987 |

* cited by examiner

METHOD AND DEVICE FOR ACCEPTING ARTICLES IN THE FORM OF SHEET-TYPE MATERIAL

BACKGROUND

The present invention relates to a method and apparatus for accepting sheet material, in particular documents of value such as bank notes, checks, etc., whereby different groups of sheet material are successively accepted and stored.

In a known method and corresponding apparatus for accepting sheet material such as bank notes, it is provided that a deliverer inputs a group of bank notes, hereinafter called a delivery, into a corresponding apparatus for acceptance. Additionally, the deliverer must identify himself, for example by using a check card whose data, e.g. account number, are read. The corresponding account number is then credited with the bank notes inputted for acceptance. For this purpose the bank notes are checked for example as to authenticity and denomination in order to determine the total sum of bank notes inputted for acceptance. The checked bank notes are then transported by the apparatus to a storage container and kept there. The bank notes are stored in the storage container in the order of their input.

However, the known method and corresponding apparatus have disadvantages in several respects. One problem is for example the use of a check card for identification. When e.g. an employee brings the delivery to a bank operating a corresponding apparatus, he must carry the account holder's check card with him to perform identification successfully. This results in certain risks, on the one hand, and if different employees make deliveries it is problematic to equip each of the employees with a corresponding check card, on the other hand. Further problems can arise upon acceptance of the delivery in the apparatus if there are malfunctions during transport of the bank notes within the apparatus that cause a change in their order, or there are errors during the check of the bank notes. In such cases it is not readily possible to assign the problematic, e.g. forged, bank notes to the actual deliverer. This makes it difficult or impossible to check the individual deliveries subsequently.

SUMMARY

It is therefore the problem of the present invention to state a method and apparatus for accepting sheet material, in particular documents of value such as bank notes, checks, etc., whereby different groups of sheet material are successively accepted and stored, that simplifies and facilitates operation for deliverers, on the one hand, and permits an improved subsequent check of individual deliveries, on the other hand.

For accepting different groups of sheet material consisting of at least one piece of sheet material, in particular documents of value such as bank notes, checks, etc., that are successively accepted and stored, the invention starts out from the consideration that each group of sheet material is assigned at least one separator referred herein as a separation means and the separation means are stored at least partly together with the associated group of sheet material for separating the associated group of sheet material from other groups of sheet material.

The advantage of the invention is in particular in that the proposed use of separation means is suitable for guaranteeing the assignability of each group of sheet material to a deliverer.

In an advantageous embodiment, it is provided that the separation means have information or are provided with information. Evaluation of the information guarantees for example the unique assignability of each group of sheet material to a deliverer. Evaluation of the information of the separation means permits this even without the use of special identification means, e.g. a check card, by the deliverer.

In a further advantageous embodiment, it is provided that additional separation means are produced to be stored together with the sheet material of each group of sheet material. The use of additional separation means allows better processing of sheet material since the additional separation means allow the individual groups of sheet material to be exactly subdivided, for example to separate forged or possibly forged sheet material from other sheet material.

DESCRIPTION OF THE DRAWINGS

To facilitate understanding, only the elements that are of importance in connection with the present invention will be described hereinafter.

DETAILED DESCRIPTION OF THE PREFERRED EMBODIMENTS

In the following the acceptance of different groups of sheet material will be described by way of example with reference to the acceptance of different groups of bank notes, hereinafter called deliveries. Other papers of value such as checks, etc., can be processed in the same way. The different deliveries are separated by a separator referred to herein as a separation means, for example separation cards. A bank note accepting machine is used for processing the different deliveries.

Figure 1B:
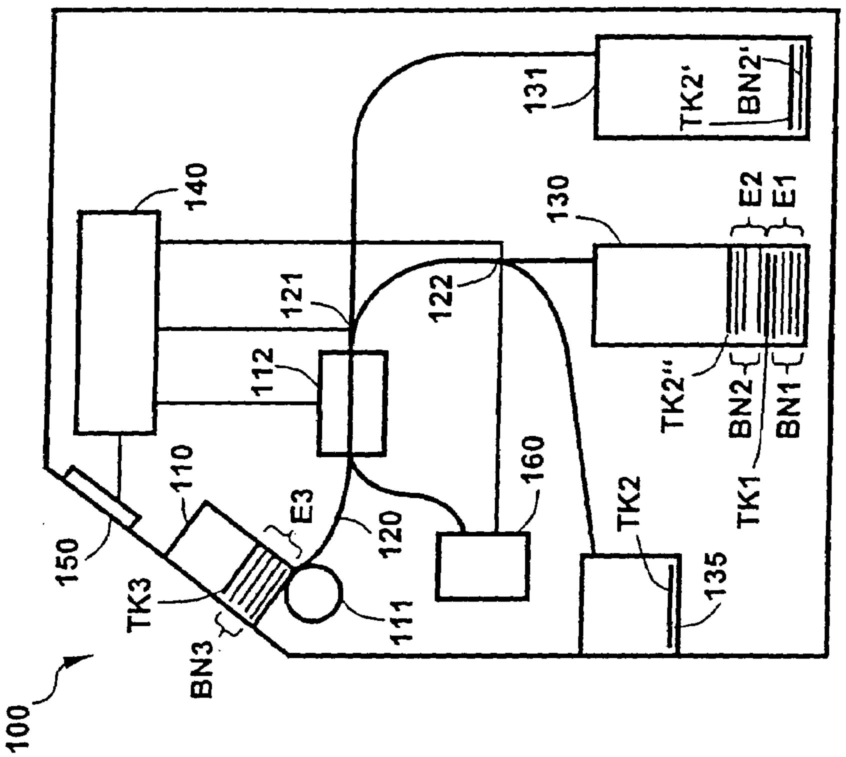
FIG. 1*b* shows a schematic second embodiment of an apparatus for accepting different groups of sheet material.
Figure 1A:
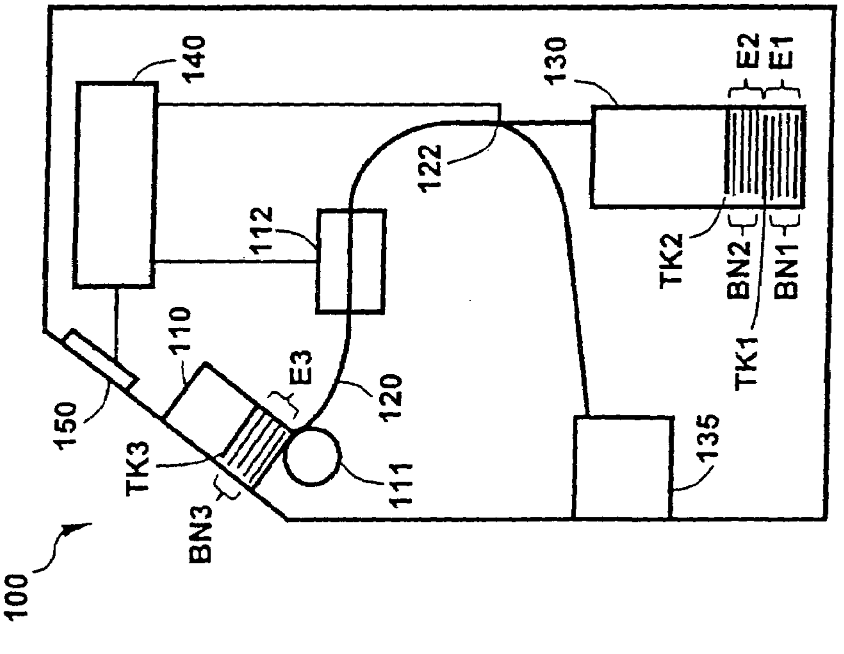
FIG. 1*a* shows a schematic first embodiment of an apparatus for accepting different groups of sheet material.

FIG. 1*a* shows a schematic first embodiment of bank note accepting machine 100 for accepting different groups of sheet material.

A deliverer has inserted delivery E3 into input 110. Sheet material of delivery E3 consists of documents of value including bank notes BN3 and separation card TK3 and is transferred individually by singler 111 to transport system 120 that guides the sheet material through sensor device 112 connected with control device 140. By means of its sensors, sensor device 112 derives data from the sheet material that are evaluated by control device 140. Evaluation can be dispensed with in the simplest case, or only a count of sheet material is performed. However, evaluation can also include a check for authenticity and type of sheet material, e.g. authenticity and denomination of bank notes. In the same way, sensor device 112 and control device 140 can detect information applied to separation card TK3. Then the sheet material is stored in storage container 130.

The data of bank notes BN3 determined during the check and the information of separation card TK3 are stored in a memory of control device 140. The data of the check can also be transferred to separation card TK3, for example in sensor device 112. The data are related with the check of bank notes BN3, for example their number, type (currency, denomination), total sum, etc. For this purpose, separation card TK3 must constitute the last piece of sheet material in delivery E3, as shown. Likewise, it is possible that a separation card is disposed as the first piece of sheet material or at any place in a delivery, in which case an additional device (not shown) must be used in which the card can be temporarily stored until the total deposit has been processed. For example, it can be provided that the card is returned to input 110 after running through sensor device 112 to be able to be processed again. In the example of FIG. 1, two deliveries E1 and E2 have already been accepted. Bank notes BN1 and BN2 and separation cards TK1 and TK2 are accordingly stacked in storage container 130, card TK1 separating first delivery E1 from second delivery E2, and second card TK2 separating second delivery E2 from delivery E3 to be processed subsequently.

All functions of bank note accepting machine 100 are controlled by control device 140, for example a microcomputer. The deliverer can control the acceptance process by means of input/output device 150, which contains for example a printer and/or a display and/or a keyboard and/or a touch screen and/or a card reader, or the deliverer is informed about the acceptance process by accepting machine 100. The abovementioned information of separation card TK3 that is detected by sensor device 112 and processed by control device 140 can contain not only accounting data such as the deliverer's account number, type and number of bank notes of the delivery, etc., but also instructions for accepting machine 100. Such instructions may include for example a special processing mode in which accepting machine 100 works in a way especially suitable for the particular deliverer. Such processing modes can be different for example for the delivery of checks or bank notes. Further, an operating mode can be provided in which separation card TK3 is not stored in storage container 130 but returned to the deliverer. This operating mode will be explained in more detail below.

Sheet material that was not recognizable during the check by control device 140 or caused problems, e.g. due to simultaneous removal of a plurality of pieces of sheet material by singler 111, can be returned to the deliverer. For this purpose, diverter 122, which is part of transport system 120, is actuated by controller 140 and nonrecognized sheet material is outputted to output 135. Instead of separate output 135, input 110 can also be used if nonrecognized sheet material is returned, as described above for the separation card. For separation a separation element, for example a plate or finger, must then be placed on delivery E3 after the onset of processing so that returned sheet material is separated from the rest of the delivery. It is also possible to perform one or more reruns for nonrecognized sheet material to reduce the number of nonrecognized sheet material. Nonrecognized sheet material is thus taken from output 135 and reinserted into input 110 or the separation element is removed. To achieve the above-described separation function of separation cards TK for individual deliveries E in case of reruns, the order of deliveries E, in particular the position of cards TK at the beginning and/or end, must be retained. Separation cards TK can thus be guided into input 110, as described above, to be singled again at the end of processing.

To retain the order of sheet material, in particular bank notes BN and separation cards TK, of individual deliveries, the abovementioned buffer (not shown) for bank notes BN and/or a further buffer (not shown) for separation card TK can also be provided in which bank notes BN or card TK of delivery E are placed during the check. Only after the end of processing, bank notes BN and card TK are removed from the buffer or buffers and transferred to storage container 130. If one or more buffers are used, it can also be provided that card TK is inserted into one of the buffers by the deliverer at the outset of processing, separately from the bank notes of the delivery. The corresponding buffer can furthermore have a sensor that detects information applied to separation card TK in the same way as sensor device 112.

As indicated above, separation cards TK can be disposed at the beginning or end of the particular delivery. Likewise, it is possible to provide a separation card at both the beginning and the end of the particular delivery. Using separation cards within a delivery can obtain further divisions, which will be explained in more detail below in connection with FIG. 4.

FIG. 1*b* shows a schematic second embodiment of bank note accepting machine 100 for accepting different groups of sheet material. The second embodiment shown in FIG. 1*b* corresponds substantially to the above-described first embodiment according to FIG. 1*a* in design and function.

Bank note accepting machine 100 additionally has second storage container 131, diverter 121 controlled by control device 140 for switching transport system 120 from first storage container 130 to second storage container 131, and device 160 controlled by control device 140 for producing additional separation cards TK', TK".

Additional separation cards TK', TK" are used for, among other things, preserving the findings obtained during the check of bank notes to permit a later, simple analysis of the content of storage container 130 or 131. In the shown example, first delivery E1 has been processed and bank notes BN1 stored together with separation card TK1 in storage container 130. Second, likewise processed delivery E2 contained bank note BN2' that was not accepted during the check, e.g. because it is a forgery or suspected forgery or because it involves a multiple removal. Bank note BN2' is therefore stored in second storage container 131, which is provided in this example for unaccepted bank notes. Remaining bank notes BN2 accepted during the check are stored in first storage container 130. For separating bank notes BN2 and BN2', device 160 for producing additional separation cards has produced separation cards TK2", TK2' and transport system 120 has transferred them to first and second storage containers 130, 131, where they delimit bank notes BN2, BN2' from bank notes of following delivery E3. Separation card TK2, which was originally inputted to input 110 together with bank notes BN2 by the deliverer, is returned to the deliverer in this example. Separation card TK2 is thus transported to output 135 by transport system 120, by actuation of diverters 121 and 122 by control device 140. Separation card TK2 can have information that, as described above, is applied in sensor device 112 and can comprise the result of acceptance of the delivery, in particular information that bank note BN2' is probably a forged bank note. However, separation card TK2 can also be reused for a later delivery. If separation card TK2 is not returned to the deliverer, it is used for separation in one of storage containers 130, 131, so that separation card TK2" or TK2' does not have to be produced by device 160. Information about the check of the bank notes and the information about deliverer, etc., contained on separation card TK2 are likewise applied to separation cards TK2' and TK2" so that the bank notes separated by them can be analyzed and assigned later.

The use of additional separation card producing device 160, which can also be disposed at another place in transport system 120, also makes it fundamentally possible for a delivery to be inserted into input 110 without a separation card. The deliverer must then identify himself e.g. by inputting his account number by means of input/output device 150 or by using a check card. The separation cards required for separating the deposits in storage container 130 and/or 131 are then produced by device 160, in dependence on the check.

If only first storage container 130 is used, additional separation cards TK', TK" can likewise be used. These are then added accordingly between the bank notes of the deposit. For example, it can be provided that additional separation card TK' is always produced when a forged bank note is recognized. Separation card TK' is then placed and stored in storage container 130 over or under the forged bank note to permit this bank note to be clearly identified later.

Likewise, it is possible to use further storage containers to permit the bank notes of a delivery to be stored for example in single denominations and/or currencies. All bank notes of one denomination and/or all bank notes of one currency are thus stored in a storage container in each case. Separation cards must accordingly be produced for each of the storage containers in which bank notes of a delivery are stored to permit the bank notes of the particular delivery to be delimited from bank notes of previous and/or following deliveries.

There are a number of ways for the deliverer to provide delivery data on the separation cards in the form of information for processing with bank note accepting machine 100.

A first approach is for the deliverer to prepare a voucher that can be used as a separation card. This can be done using special programs by which the deliverer detects the data of his delivery and enters them in the books and the program automatically performs a data transfer with the detected data to the service provider, e.g. over the Internet or other telecommunication routes, and an accompanying slip is printed at the deliverer's that is enclosed in the delivery and can be used directly as a machine-readable separation card during bank note processing.

In this case the embodiment of a separation card with electronic coding, e.g. an embedded chip and transponder, is of particular advantage. The information applied by the deliverer (e.g. deliverer identification, delivery identification, total nominal value, number of bank notes per denomination, account number, bank code number, etc.) can be read in its totality or as a subset by the bank note accepting machine and adopted for processing. This method has the advantage that preparatory work on bank note accepting machine 100 is unnecessary.

Figure 5:
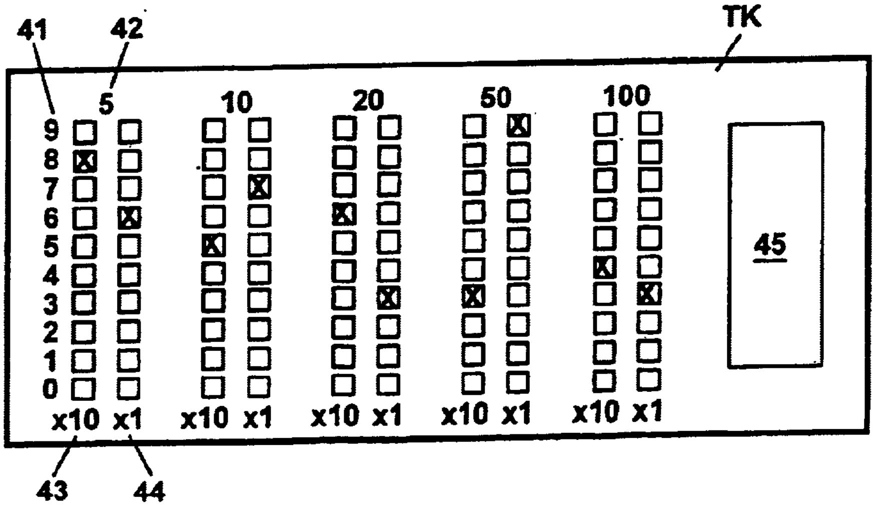
FIG. 5 shows a first embodiment of separation means for detecting information for a group of sheet material.

In another variant, the deliverer can for example fill in fields on a preprinted separation card or check them off (in the manner of a lotto coupon) to mark the value of his delivery or the number of bank notes of the particular denominations. Such a separation card is shown in FIG. 5. Separation card TK has fields for each denomination. For denomination "five" 42 there are fields 41 for the numbers from "zero" to "nine" that are weighted with multiplier "one" 44 and a multiplier "ten". In the shown example there are 86 bank notes of the denomination "five." Further field 45 can contain data that e.g. identify the deliverer.

Figure 2A:
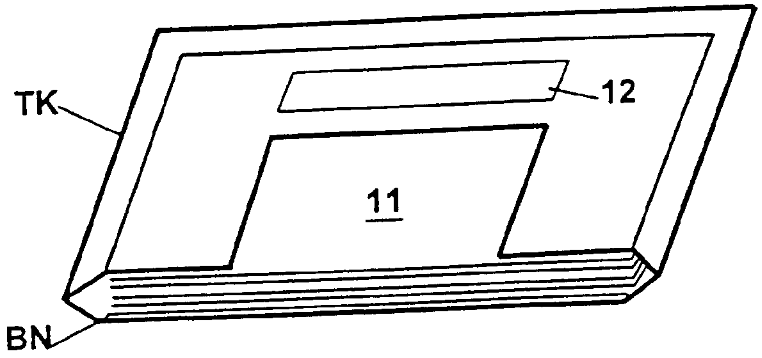
FIG. 2*a* shows a first embodiment of separation means for a group of sheet material with an inserted group of sheet material.
Figure 2B:
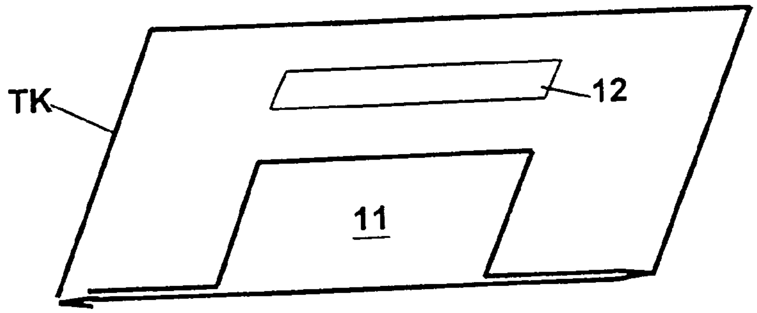
FIG. 2*b* shows the first embodiment of separation means for a group of sheet material without sheet material.
Figure 3:
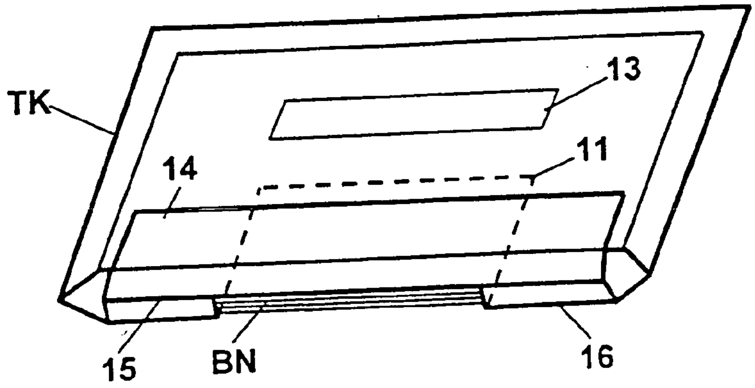
FIG. 3 shows a second embodiment of separation means for a group of sheet material with an inserted group of sheet material.

FIGS. 2 and 3 show further embodiments of separation cards. Separation cards TK are formed in the shown cases as containers, in particular envelopes or covers of paper, paperboard or cardboard.

As shown in FIG. 2*a*, bank notes BN of a delivery are inserted into the envelope. Envelope TK moreover has gap 11 that singler 111 can engage to remove sheet material individually out of the opening of the envelope. When the total sheet material is removed, as shown in FIG. 2*b*, singler 111 grasps the envelope on the side of the envelope opposite gap 11.

A variant of container or envelope TK is shown in FIG. 3. Envelope TK is equipped with closure means 14 that are closed after insertion of a delivery into envelope TK. The delivery can thus be transported safe from access by means of envelope TK. For processing in bank note accepting machine 100 it can be provided that a cutting tool is disposed in singler 111 for first checking the integrity of closure means 14 and then opening closure means 14 of envelopes TK to begin singling. The cutting tool can cut open closure means 14 for example along line 15 shown in FIG. 3. But closure means 14 can also be completely removed by the cutting tool, e.g. along line 16.

In a special embodiment, containers or envelopes TK can be designed so as to carry information that can be read by machine, so that for example data fields 12 and/or 13 can be present on one or both sides of envelope TK. Closure means 14 can also have data fields having the same information as associated envelopes TK Then it is possible for closure means 14 to be also used in bank note accepting machine 100 and stored in storage container or containers 130, 131 together with the bank notes to make the bank notes assignable to the particular deliveries. Closure means 14 can thus be automatically taken into account and transported by bank note accepting machine 100. It is thus possible to separate both accepted bank notes and unaccepted bank notes of individual deliveries by envelopes TK or closure means 14.

Figure 4:
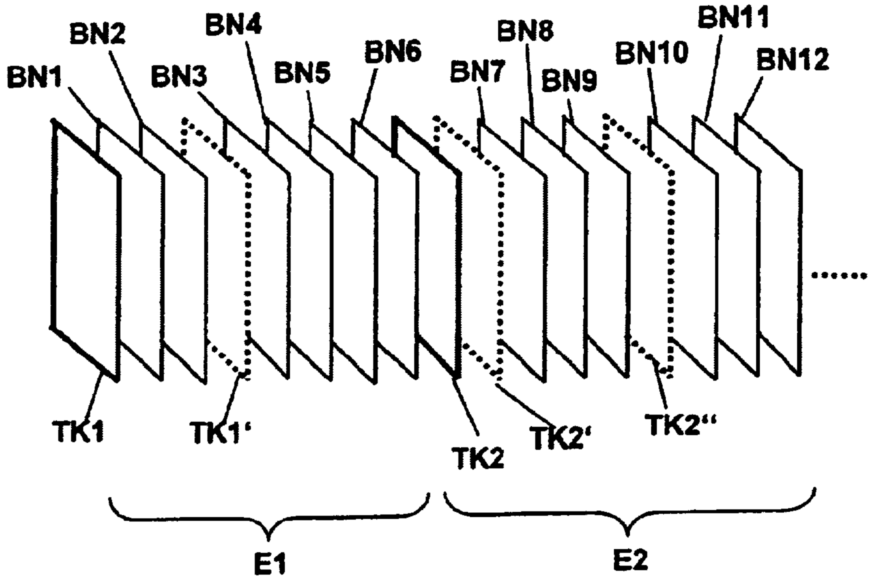
FIG. 4 shows an arrangement of a plurality of groups of sheet material with associated separation means.

With reference to the structure of groups of sheet material or deliveries shown in FIG. 4, further functions of the separation means shall be described in more detail. FIG. 4 shows first delivery E1 consisting of separation means TK1, bank notes BN1 to BN6 as well as further separation means TK1' located between bank notes BN2 and BN3, and second delivery E2 consisting of separation means TK2, bank notes BN7 to BN12 as well as two further separation means TK2' and TK2". Last bank note BN12 can be followed by further deliveries, as indicated by a dotted line in FIG. 4.

Separation means TK1 and TK2 can be formed as separation cards, as shown in FIG. 4, or as containers, as described above in connection with FIGS. 2 and 3. Separation means TK1 and TK2 are recognized by sensor device 112 with reference to specific properties, as described. They can moreover have information that can be used for identifying deliveries. Further separation means TK', TK" are formed as separation cards. In the simplest case, further separation means TK', TK" are constituted by part of the sheet material itself. For example, the serial number of a bank note can be used for unique identification. The serial number is then assigned the corresponding data, such as deliverer, deposited amount, etc., stated on separation card TK for processing in controller 140 of bank note accepting machine 100.

As shown in FIG. 4, further separation means TK', TK" can be disposed at any places within particular delivery E, after separation means TK. In first delivery E1, separation means TK1' is located for example after separation means TK1 and bank notes BN1 and BN2. In second delivery E2, further separation means TK2' are located immediately after separation means TK2 and further separation means TK2" between bank notes BN9 and BN10. The use of further separation means TK', TK" within deliveries E thus also permits the formation of subgroups of bank notes BN1 to BN2, BN3 to BN6, BN7 to BN9 and BN10 to BN12. Said subgroups within the deliveries can correspond for example to individual cash registers of a supermarket.

In the following, different possibilities for coding and evaluating separation means will be described, said separation means always being referred to as separation cards for simplicity's sake.

Separation cards can be provided with information. This information can be an identification code that permits an indirect link with the data of the delivery held in another system. This identification code can be previously printed, or prepared during preparation with the aid of an apparatus for coding separation cards. Additionally or alternatively, the separation card can contain direct information about the delivery (customer's name, nominal value, number of bank notes separated according to denomination, etc.) and be used as a receipt for settlement. This information can be applied in the form of a machine-readable bar code, as information on a magnetic stripe or in the form of machine-readable character sets (OCR font). It is prepared by the deliverer himself, as described above, or made available and sent e.g. by mail or the Internet by a central office, e.g. the bank operating the bank note accepting machine.

Figure 6:
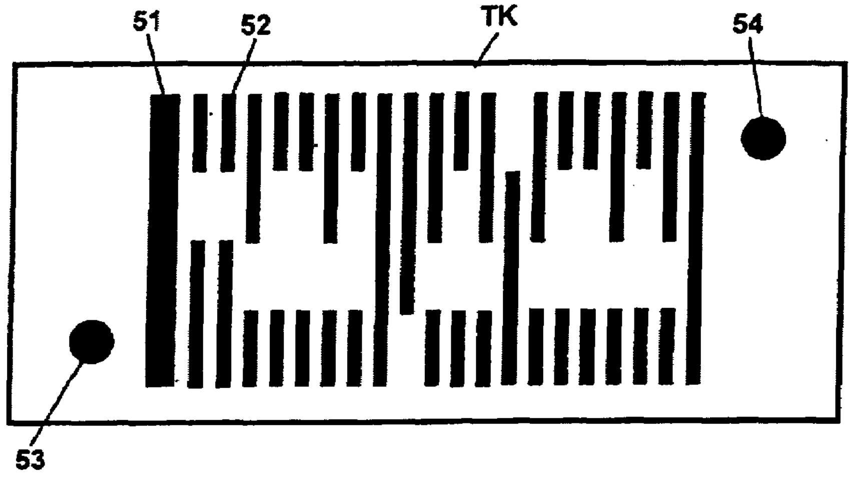
FIG. 6 shows a second embodiment of separation means for detecting information for a group of sheet material.
Figure 7:
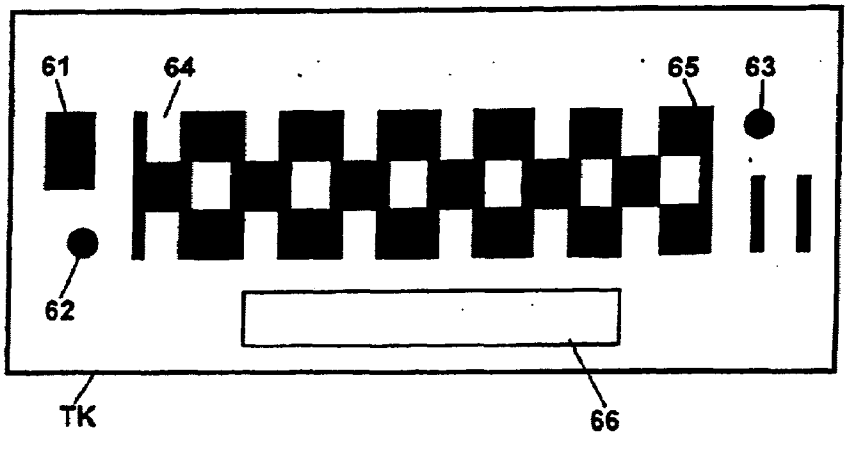
FIG. 7 shows a third embodiment of separation means for detecting information for a group of sheet material.

Further possibilities for individual identification of the separation card include machine-readable information that establishes a unique relation to a delivery e.g. by means of a two-dimensional bar code. This permits either the amount of information to be distinctly increased or the information to be coded so that it can also be read by a sensor device with low resolution. Separation card TK with such a two-dimensional bar code is shown in FIG. 6. To permit position-independent evaluation of two-dimensional bar code 52, orientation marks 51, 53, 54 are provided. Further separation card TK with a two-dimensional data block matrix is shown in FIG. 7. Separation card 60 likewise has orientation features 61, 62, 63. The information is contained in the two-dimensional data block matrix having a plurality of data blocks 64 to 65. Between individual data blocks 64 to 65 there can be magnetic or electroconductive stripes that allow recognition even in the case of concealment by multiple removal. Further information, e.g. in plaintext, can be contained in additional field 66.

Another possibility for applying and reading information on a separation card is to use optical codings as are common for example in compact discs. This technology permits a very great amount of information to be applied to a very small area and read optically, for example with a laser.

A further possibility for applying and reading information on a separation card is to use methods with place- and/or intensity-dependent features on the separation card. For example, the arrangement and size of conductive elements on the separation card can be used for individual coding of separation cards. This method can be expanded if these elements have different states of conductivity and the value of conductivity is detected and evaluated by a corresponding evaluation method. A similar method can be performed with the aid of magnetic elements.

A further possibility is to use optically visible prints that differ clearly in form, arrangement, intensity and spectral property (color) and thus allow individual identification.

A very advantageous embodiment of the separation card results from using a chip embedded on the separation card with a transponder. The transponder is applied to the separation card in the form of a coil or antenna and connected with a chip embedded in the separation card. This coil or antenna is used firstly to feed in energy for the power supply of the embedded chip, secondly for data transfer to the chip (writing information), thirdly for data transfer of information stored on the chip (reading information), and fourthly for reliable recognition of the presence of a separation card according to the above explanations. The chip is a component that can store and/or process information. This embodiment results in a number of advantageous features for a separation card application, since many times more information can be stored in this way than for example in information based on a bar code or an OCR font. In addition, the method allows writing access to the information of the separation card and thus for example the addition of information in bank note accepting machine 100. In a first step, information about the deliverer, the nominal amount of the bank note value or the nominal number of the particular denominations as well as identification information can be written for example during preparation of processing. During machine processing, this information is read completely or partly by bank note accepting machine 100 and in a further step supplemented by writing access in bank note accepting machine 100 by further processing data, for example the particular number of bank notes recognized as authentic in terms of value and stacked.

This method has the further advantage that the information is also read and written if the separation card is masked by bank notes in certain cases.

The invention claimed is:

1. A method for accepting documents of value wherein different groups of documents of value are successively accepted and stored, and wherein the different groups of documents of value each consist of at least one document of value, and the different groups of documents of value are stored in a storage container in an apparatus, the method comprising the steps of:

generating in the apparatus at least one separator stored by the apparatus and used to separate the documents of value;

assigning each group of documents of value to the separator before or during processing of the documents of value by the apparatus;

transferring the separator, at least partly, together with an associated group of documents of value to the storage container; and separating the associated group of the documents of value in the storage container from other groups of the documents of value with the separator.

2. The method according to claim 1, wherein the documents of value of each group thereof are checked before storage, for authenticity, value and number.

3. The method according to claim 1, wherein the separator is assigned to each group of the documents of value at the beginning thereof.

4. The method according to claim 1, wherein, the separator is assigned to each group of the documents of value at the end thereof.

5. The method according to claim 1, wherein the separator is assigned to each group of the documents of value at the beginning and end thereof.

6. The method according to claim 1, wherein at least one additional separator is assigned within a group of the documents of value, thereby forming subgroups of the documents of value.

7. The method according to claim 1, wherein the separator is provided with information before and/or during acceptance of the associated group of the documents of value.

8. The method according to claim 2, wherein the separator is provided with information during and/or after the check of the documents of value of the associated group thereof.

9. The method according to claim 7, wherein the information comprises statements about deliverer and/or type and/or composition of the documents of value and/or the manner of processing of the documents of value of the respective associated group thereof.

10. The method according to claim 7, wherein the information, or parts thereof, contained on the separator is detected and taken into consideration during the acceptance and/or check and/or storage of the respective associated group of the documents of value.

11. The method according to claim 1, wherein at least one additional separator is provided and placed in the storage container.

12. The method according to claim 2, wherein at least one further storage container is provided for storing the groups of the documents of value.

13. The method according to claim 12, wherein the documents of value of each group of the documents of value stored in the further storage container is separated by the separator.

14. The method according to claim 11, wherein the documents of value of each group thereof stored in the further storage container are separated by the at least one additional separator.

* * * * *